May 27, 1969
B. S. SMILGYS
3,446,432
METER DUPLICATOR
Filed Nov. 25, 1966
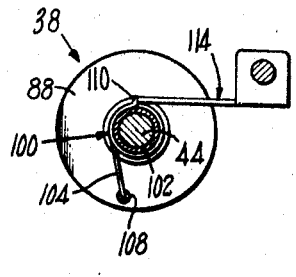
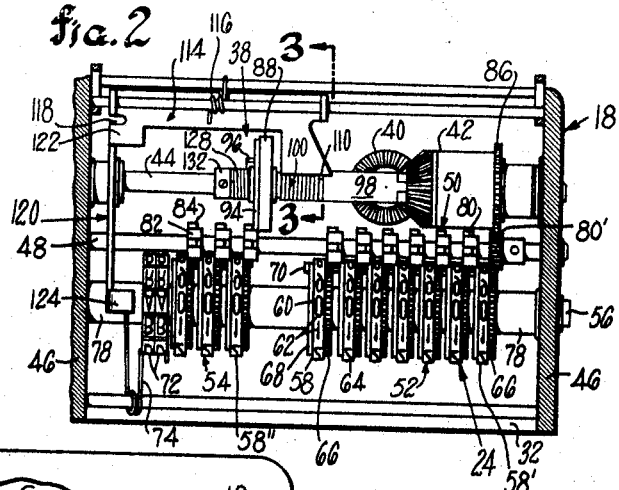
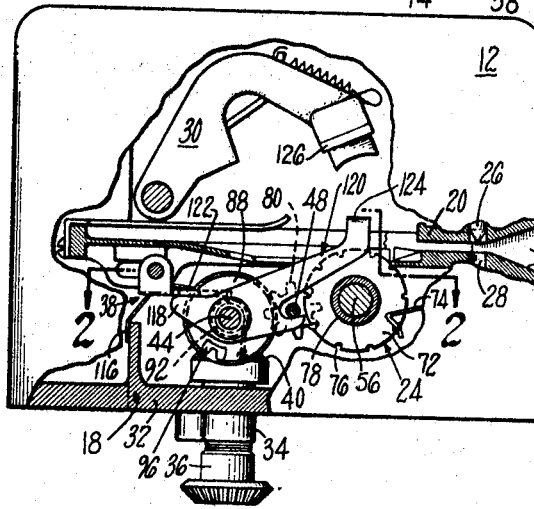
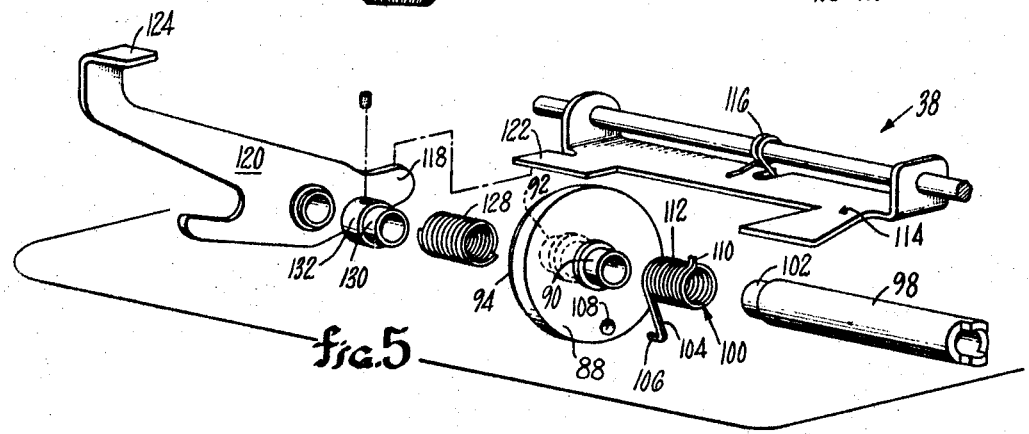
INVENTOR.
BRUNO S. SMILGYS
BY
Lindsey, Prutzman and Hayes
ATTORNEYS

United States Patent Office 3,446,432
Patented May 27, 1969

3,446,432
METER DUPLICATOR
Bruno S. Smilgys, Hartford, Conn., assignor to Veeder Industries Inc., Hartford, Conn., a corporation of Connecticut
Filed Nov. 25, 1966, Ser. No. 596,975
Int. Cl. B67d 5/24
U.S. Cl. 235—94    8 Claims

ABSTRACT OF THE DISCLOSURE

A sales number control mechanism operative during the initial phase of a fluid delivery is incorporated in a ticket printing meter duplicator. The control mechanism includes a control disk carrying a locking ring and driving gear for consecutively advancing a sales number wheel a single unit for each revolution of the disk. A spring clutch provides a driving connection for moving the disk through a single revolution for each fluid delivery operation.

---

The present invention relates to meter duplicators and the like adapted to record the meter readings of consecutive operating cycles of the meter. More particularly, the present invention relates to a new and improved meter duplicator useful in fluid delivery operations, such as in the dispensing of fuel oil and the like, wherein the duplicator is adapted to print a ticket indicating a meter reading and sales number both before and after each fluid delivery operation.

A principal object of the present invention is to provide a meter duplicator of the type described which employs an improved sales number control mechanism for positively and consecutively indexing a sales number for each operating cycle of the meter.

Another object of the present invention is to provide a new and improved mechanism for advancing the sales number on a meter duplicator adapted to print a ticket before and after a complete fluid delivery operation, said mechanism being operable to lock the sales number against advancement except during the initial phase of the fluid delivery operation.

Still another object of the present invention is to provide a meter duplicator including a printer operable for releasing a sales number advance mechanism whereby the sales number is advanced only a single unit during each fluid delivery recorded by the meter.

A further object of the present invention is to provide a new and improved consecutive sales number control mechanism for a ticket printing meter duplicator which facilitates the advancement of the sales number in response to the actuation of the printing mechanism, the sales number being locked against positive indexing until operation of the initial phase of a fluid delivery and the ticket being locked within the mechanism until the entire fluid delivery and printing cycles have been completed.

A still further object of the present invention is to provide a sales number control mechanism having the features set forth hereinbefore while at the same time providing simplicity in design, durability in construction, and ease and reliability in operation.

Other objects wll be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawing:

FIG. 1 is a side elevational view, partially broken away and partially in section, of a meter duplicator embodying the present invention;

FIG. 2 is a top sectional view taken along the line 2—2 of FIG. 1, illustrating the interior mechanism of the duplicator;

FIG. 3 is an enlarged side sectional view of a portion of the sales control mechanism taken along the line 3—3 of FIG. 2;

FIG. 4 is a sectional view similar to FIG. 3, illustrating the control mechanism immediately after a printing operation; and FIG. 5 is an enlarged exploded perspective view of the sales number control mechanism of the present invention.

Referring now to the drawing in greater detail wherein like reference characters indicate like parts throughout the several figures, there is illustrated in FIG. 1 an embodiment of the duplicator of the present invention, generally indicated by the reference numeral 10. The duplicator 10 is provided with a generally rectangular boxlike enclosure or housing 12 and is adapted for mounting on or adjacent a visible register meter (not shown) such as those meters normally employed on fuel oil trucks and the like. The front face 14 of the housing 12 is provided with a longitudinal slot 16 for receiving a ticket or card on which a reading is printed before and after fuel delivery so that the customer will be provided with a printed receipt indicating the quantity of fuel pumped into the customer's tank.

In accordance with the present invention individual sales numbers associated with each delivery or operating cycle are also printed on the ticket while it is within the duplicator. It will be appreciated that prior to initiation of the operating cycle, the fuel delivery monitoring and printing mechanisms of the duplicator 10 are preferably locked against actuation. However, upon inserting the ticket within the duplicator, the operating cycle may be initiated by stamping a ticket with an initial meter or counter reading and an initial sales number reading. Typically, this is accomplished by cranking a handle (not shown) located on the exterior of the housing 12. The cranking will not only effectuate the desired ticket printing but preferably will also lock the ticket within the duplicator until completion of the operating cycle. At the same time the fluid flow monitoring mechanism of the duplicator is unlocked to permit the operation thereof during the fuel delivery. The visible register of the meter is, of course, actuated during the fuel delivery in synchronism with the monitoring mechanism of the duplicator to indicate the quantity of fuel pumped into the customer's tank. In accordance with the present invention the fuel delivery also effects advancement of the sales number a single consecutive unit or count. Upon completion of the delivery, the number wheels of the register and the monitoring mechanism of the duplicator are again locked and the ticket restamped with the final reading, following which the ticket is released by the duplicator to permit its removal. The customer is thereby provided with a direct reading of the amount of fuel pumped into his tank during the delivery. Additionally, since delivery cannot be made until the ticket has been stamped and the ticket cannot be removed from the duplicator until the delivery has been completed and a second stamping operation effectuated, the customer is assured of an accurate and reliable recording of the amount of fuel delivered during the fluid dispensing operation.

Referring now specifically to FIGS. 1 and 2 of the drawing, the duplicator 10 is illustrated as being provided with a frame member 18 which suitably supports a reciprocable ticket receiving tray 20 positioned so that the diverging mouth 22 of the tray is in registry with the generally rectangular longitudinally extending slot 16 in the front face 14 of the housing and a ticket inserted therein will overlie and be exposed to a printing wheel assembly 24 of the duplicator monitoring mechanism. The tray 20 is reciprocably movable relative to the slot 16 in a plane tangential to the wheel assembly 24 for positioning of the ticket prior to each printing operation. Preferably, the tray 20 is provided with suitable ticket locking means such as the pin 26 located adjacent the mouth 22 of the tray. Upon actuation the pin 26 passes downwardly through the ticket into the aligned aperture 28 and is maintained in this ticket retaining position until completion of the entire delivery and printing cycle.

The frame 18 which supports the rotatable printing arm 30 as well as the print wheel assembly 24 includes a generally flat base portion 32 having a depending apertured boss 34 in which is journaled the geared input shaft 36 for driving both the print wheel assembly 24 and a sales number control mechanism, generally designated 38. The input shaft 36 of the duplicator is suitably connected to the meter (not shown) for actuation in synchronism therewith during fuel delivery. As best seen in FIG. 2, the shaft 36 is provided with a bevel gear 40 which drivingly engages the bevel geared spindle 42 rotatably supported on the control mechanism supporting shaft 44 mounted within the spaced end walls 46 of the frame 18. The upstanding parallel end walls 46 additionally supportingly receive the shaft 48 mounting the transfer pinion sub-assembly 50 as well as the reciprocating ticket receiving tray 20, as mentioned hereinbefore, the tray being adapted to slide intermediate the printing arm 30 and the print wheel assembly 24 along a plane tangential to the print wheel assembly at its point of contact by the printing arm.

The print wheel assembly 24, operatively interconnected with the meter through the geared spindle 42 and duplicator input shaft 36, is suitably locked against rotation until after the initial printing operation. Thereafter it is driven in synchronism with the meter during the entire fluid delivery. The assembly 24 comprises two separate and operatively independent banks or sub-assemblies of printing wheels, a first counter bank 52 and a second spaced sales number bank 54, both banks of wheels being coaxially mounted for independent rotational movement on the print wheel supporting shaft 56.

The wheels of the assembly 24 are all of the same radial dimensions and are aligned in side-by-side relationship in order to present a substantially planar printing surface to a ticket carried by the tray 20. As illustrated, all the number wheels 58 are identical and comprise wheel body portions 60 having suitable print-out indicia 62, such as the consecutive raised numerals from 0 to 9, on their arcuate peripheral surfaces 64. The wheels 58 are preferably molded as single units so that on one side of each body portion 60 there is provided an integrally formed radially recessed driven gear 66 while on the opposite side of each wheel is an integrally formed radially recessed locking ring 68 which carries a two-tooth driving gear 70. As will be noted, the wheels 72, located on the left of the sales number wheel bank 54 as viewed in FIG. 2, carry alphabetical print-out indicia and are devoid of gearing. These wheels are manually set in a desired fixed position and held therein by the cooperative action between spring detent 74 and the peripheral notches 76 on the wheels 72. The wheels in each bank are spaced along the supporting shaft 56 by a distance approximately equal to the width of their hubs with each bank of wheels being suitably spaced from the side walls 46 of the frame and from each other by the sleevelike spacer members 78 mounted on the shaft 56.

Each of the geared number wheels 58 is advanced in the conventional manner by the cooperative interengagement with a transfer pinion 80 of the subassembly 50 rotatably mounted on the pinion shaft 48. As shown, the pinions 80 are disposed intermediate the number wheels and, except for the full pinion 80' located on the extreme right of the pinion subassembly 50, as viewed in FIG. 2, are provided with a plurality of alternating full and mutilated teeth 82, 84, respectively, for providing the appropriate count transfer between the number wheels making up the respective counter and sales number wheel banks. The pinion 80' drives the lowest order number wheel 58' of the counter bank 52 and meshes with the driving gear 86 of the spindle 42. Accordingly, if desired, pinion 80' may be fixed to the shaft 48 in order to provide an appropriate means for locking the entire print wheel assembly 24.

The sales number control mechanism 38 of the present invention driven by the input shaft 36 includes, as best seen in FIG. 5, a control disk 88 having generally cylindrical sleevelike hub portions 90, 92 extending outwardly from opposite sides thereof for rotatably mounting the disk on the control mechanism shaft 44. The disk 88 is provided with a recessed locking ring 94 and a two-tooth driving gear 96 similar to the locking ring and driving gear carried by each of the number wheels 58 in the print wheel assembly 24. Thus, as shown in FIGS. 1 and 2, the control disk 88 cooperates with an abutting transfer pinion 80 to controllably advance the lowest order number wheel 58'' of the sales number wheel bank 54 a single count with each revolution of the control disk 88.

A tubular drive sleeve 98 mounted on the control member shaft 44 and driven by the spindle 42 is operatively connected to the control disk 88 by a torsion spring clutch 100. The clutch is shown as mounted on both the reduced end portion 102 of the sleeve 98 and the outwardly extending hub portion 90 of the disk 88 for transferring the desired rotational movement from the sleeve to the disk. The clutch 100 is provided with a straight elongated terminal arm 104 having a foot 106 extending into the side aperture 108 of the disk 88 thereby assuring a direct driving connection between the input shaft 36 and the control disk 88 so long as the clutch operatively engages the reduced end portion 102 of the drive sleeve. On the end of the clutch 100 adjacent the drive sleeve 98 there is provided a short hook end 110 extending outwardly from the flexible concentric windings 112 for engagement by a clutch release armature 114. As shown in FIG. 3, the armature 114 is pivotally mounted in overlying relationship to the windings 112 and is adapted to provide a barrier for the short hook end 110 thereby causing the windings 112 to loosen their hold on sleeve portion 102 and interrupt the cooperative driving connection between the drive sleeve 98 and the control disk 88.

The armature 114 is lifted out of engagement with the clutch 100 against the bias of spring 116 by the action of tail portion 118 of the pivotable lever 120 against the tab 122 of the armature 114. As shown in FIG. 1, the tab 122 is disposed above the tail portion 118 and is responsive to the upward movement of the tail portion 118 to permit a release of the hook end 110 from the armature 114. Upon release, the windings 112 of the clutch 100 will relax to move the end 110 under the armature 114, as illustrated in FIG. 4. Thereupon the clutch will re-engage the reduced end portion 102 of the drive sleeve to drive the control disk 88 one revolution before the armature 114 again contacts hook end 110 to thereby disengage the driving connection between the input shaft 36 and the disk 88. It will of course be appreciated that one revolution of the control disk 88 will be effective to advance the lowest order sales number wheel 58″ a single unit or count.

The pivotable operating lever 120 which acts against the armature 114 to engage the clutch 100 is provided with a press foot portion 124 at its forwardmost end which is positioned adjacent and above the print wheel assembly 24 at its point of contact by the printing arm 30. Thus, as is apparent from FIG. 1, the platen 126 of the printing arm 30 will contact and depress the foot portion 124 during each printing stroke of the arm thereby causing the lever 120 to rotate against the bias of spring 116 and effectuate release of the clutch 100.

The sales number control mechanism 38 is also provided with a torsion spring one-way brake 128 which overlies both the disk hub portion 92 and a cylindrical portion 130 of the retainer 132 mounted on the shaft 44. Thereby the brake 128 will prevent accidental reverse rotation of the disk 88 and the customer will be assured of consecutive advancement of the sales number for each delivery of fuel.

Operation of the described duplicator is rapid, facile and dependable. As mentioned hereinbefore, a ticket inserted into the tray 20 of the duplicator is suitably locked therein by the pin 26 whereupon the tray is reciprocally moved to properly position the ticket for an initial printing operation. The pivotally mounted printing arm 30 springs downwardly whereby the printer platen 126 forces the ticket into contact with the printing wheel assembly 24 and effectuates the desired initial recording of both the counter reading and the sales number reading. Simultaneously the printer platen 126 depresses the press foot 124 thereby rotating the pivotable lever 120 and causing the tail portion 118 thereof to act against the tab 122 moving the armature 114 out of contact with the spring clutch 100 against the bias of spring 116. The clutch immediately assumes the position illustrated in FIG. 4 and the printing arm is retracted to the standby position depicted in FIG. 1. The printing wheel assembly 24 is then unlocked permtiting delivery of the fuel oil. As the fuel is delivered the input shaft 36 is actuated to rotate both the counter wheel bank 52 and the drive sleeve 98. Since the clutch 100 has been released by the armature 114 to engage the sleeve 98, the control disk 88 is rotated one full revolution thereby advancing the sales number a single consecutive unit or count. As the clutch and disk complete the single revolution the armature 114 again contacts the short hook end 110 and holds the clutch 100 out of driving engagement with the sleeve 98 thereby locking the sales number against further movement during the remainder of the fluid delivery operation. Upon completion of the fluid delivery the printing wheel assembly 24 is again locked against movement, the ticket holding tray 20 is repositioned and the printing arm 30 again stamps the ticket to record the advanced sales number and the post-delivery reading on the counter bank 52, after which the ticket retaining pin is retracted to release the ticket and permit its removal from the duplicator.

As will be apparent to persons skilled in the art, various modifications and adaptations of the structure above-described will become readily apparent without departure from the spirit and scope of the invention, the scope of which is defined in the appended claims.

The embodiments of the invention in which an exclusive property or privilege is claimed are defined as follows:

1. In a meter duplicator adapted to record counter readings of consecutive meter operating cycles wherein the duplicator includes a counter wheel assembly and a sales number wheel subassembly, the improvement of a sales number control mechanism including sales number advancing means for positively indexing the subassembly a sigle full unit for each operating cycle, said full unit indexing occurring during the initial reading change of the counter, subassembly locking means associated with the advancing means and movable between locked and unlocked positions for controlling the consecutive indexing of the sales number wheel subassembly; drive means operable during each meter operating cycle for driving the counter and engageable with the locking means and the advancing means for moving the locking means out of and into the locked position and advancing the sales number wheel subassembly when the locking means is out of its locked position, clutch means providing releasable driving engagement between the drive means and the locking means for moving the locking means and ensuring indexing of the subassembly said single full unit by the sales number advancing means; and clutch control means responsive to the recording of a counter reading for controlling the driving engagement of the clutch means and being adapted to releasably hold the clutch means in a nondriving condition subsequent to each consecutive indexing of the subassembly to thereby prevent greater than a single full unit advance of the subassembly for each operating cycle of the meter.

2. The duplicator of claim 1 including a printing platen adapted to undergo a printing stroke prior to operation of the drive means and wherein the clutch control means comprises an armature for holding the clutch means out of engagement, said armature being actuated during the printing stroke of the platen to release its hold on the clutch means thereby providing driving engagement between the drive means and the locking means during initial operation of the drive means.

3. The duplicator of claim 1 wherein the clutch means comprises a spring clutch and the clutch control means includes a pivotable armature operable to engage the clutch thereby releasing the drive means from the locking means.

4. The duplicator of claim 3 including a printing platen adapted to undergo a printing stroke prior to operation of the drive means and wherein the armature is biased into engagement with the clutch and the clutch control means further includes a rotatable lever abutting the armature and having a foot portion so positioned for contact by the platen during the printing stroke that the platen effects rotation of the armature against the bias thereof to release the clutch.

5. The duplicator of claim 1 wherein the counter and the subassembly include printing wheels having indicia bearing outer peripheral surfaces and the duplicator includes a printing platen operable for pressing a sheet against said surfaces to thereby record a counter and subassembly reading, the clutch control means being responsive to the operation of said platen for releasing the clutch means and effecting the driving connection between the drive means and the locking means whereby the locking means can be driven out of the locked positon for advancement of the sales number wheel subassembly.

6. The duplicator of claim 5 including means constantly operative for prevention reverse indexing of the subassembly.

7. In a duplicator as set forth in claim 1 wherein a ticket is printed by the stroke of a printing platen, the improvement wherein the locking means includes a transfer pinion in driving engagement with the sales number wheel subassembly and a rotatable disk provided with a locking ring and a driving gear, said pinion being held against movement by the locking ring to thereby lock the subassembly except during intermeshing driving engagement between the driving gear and the transfer pinion.

8. In a duplicator as set forth in claim 1 wherein a ticket is printed before and after operation of the counter by a printing platen striking against the counter, the improvement wherein the sales number control mechanism includes a supporting shaft, the locking means includes a locking and driving disk having a fixed, generally cylindrical hub portion mounted on the shaft for rotation, the driving means includes a generally cylindrical sleeve mounted on the shaft coaxially with the hub, and the clutch means comprises a torsion spring connected to the disk and mounted for operation over the hub and the sleeve to thereby provide a driving connection between the sleeve and the disk.

References Cited

UNITED STATES PATENTS

| | | | |
|---|---|---|---|
| 3,139,027 | 6/1964 | Norman | 101—96 |
| 3,313,453 | 4/1967 | Johnson | 222—30 |
| 3,369,704 | 2/1968 | Manke | 222—30 |

STEPHEN J. TOMSKY, *Primary Examiner.*

U.S. Cl. X.R.

101—96; 222—30